United States Patent [19]

Takahashi

[11] Patent Number: 4,480,493
[45] Date of Patent: Nov. 6, 1984

[54] TRANSAXLE LUBRICATION SYSTEM

[75] Inventor: Kotei Takahashi, Yokohama, Japan

[73] Assignee: Nissan Motor Company, Limited, Japan

[21] Appl. No.: 350,384

[22] Filed: Feb. 19, 1982

[30] Foreign Application Priority Data

Feb. 20, 1981 [JP] Japan .................................. 56-24766

[51] Int. Cl.$^3$ ........................ F16H 57/04; F01M 9/00
[52] U.S. Cl. ..................................... 74/467; 184/6.12
[58] Field of Search ............. 74/467; 184/11 R, 13 R, 184/6.12, 6.22

[56] References Cited

U.S. PATENT DOCUMENTS

| | | | |
|---|---|---|---|
| 1,533,641 | 4/1925 | Fekete et al. | 184/6.12 |
| 2,015,108 | 9/1935 | Harper | 74/467 |
| 2,049,234 | 7/1936 | Thomas et al. | 184/11 |
| 3,785,458 | 1/1974 | Caldwell et al. | 184/6.12 |
| 4,175,643 | 11/1979 | Jenkins | 74/467 |
| 4,217,794 | 8/1980 | Yasui et al. | 74/467 |
| 4,222,283 | 9/1980 | Nagy | 74/467 |
| 4,242,923 | 1/1981 | Nishikawa et al. | 74/467 |
| 4,329,887 | 5/1982 | Kawamoto | 74/467 |
| 4,359,909 | 11/1982 | Sogo | 74/467 |

FOREIGN PATENT DOCUMENTS 2915706 11/1979 Fed. Rep. of Germany ........ 74/467
2041117 9/1980 United Kingdom .

Primary Examiner—Lawrence J. Staab
Assistant Examiner—Michael D. Bednarek
Attorney, Agent, or Firm—Lowe, King, Price & Becker

[57] ABSTRACT

In a transaxle (1), a funnel-like oil pocket member (60) receives lube oil supplied from a gutter-like projection (43) formed to overlap a ring gear to collect oil sticking to a side thereof. The funnel-like member supplies lube oil to a lube oil passage (47) formed in a main shaft (18) through a hole (63) and a space (δ).

4 Claims, 5 Drawing Figures

TRANSAXLE LUBRICATION SYSTEM

BACKGROUND OF THE INVENTION

1. Field of the Invention

The present invention relates to a lubrication system for automotive transaxles and more particularly to a gutter-like projection provided or an inner wall of a transaxle housing to catch splashed lube oil and introduce it to a transmission input or main shaft journal supporting portion and thenceforth to a lube oil passage formed in the shaft.

2. Description of the Prior Art

Generally, in automotive vehicles equipped with transaxles for a front-engine front-drive system, i.e., F-F vehicles, the overall length of the transmission cannot be as long as that in F-R (front-engine rear-drive) vehicles. For this reason, the input shaft and main shaft of the transmission to be received within the transmission case are arranged in parallel to each other, and between these shafts there is provided a gear train for transmitting motion therebetween. To an open end of the transmission housing (ie, an, entrance portion through which the above shafts and gear train are to be inserted into the transmission case during assembly), there is secured a clutch housing closing the open end, and on this clutch housing one end of each of the above shafts is journaled by bearings. Within the clutch housing, a differential for driving axle shafts (for front wheels) is placed in a manner to form together with the transmission a single unit, i.e., a so-called "transaxle". The differential is operated by a final gearing including a pinion mounted on the main shaft and a ring gear mounted to the differential case. The transaxle is charged with lube oil so that the ring gear is plunged at substantially the lower half part thereof into the oil to splash it when rotated. The clutch housing is formed with a gutter-like projection for catching the lube oil splashed on the housing walls and introducing it to the main shaft journal supporting portion of the clutch housing.

In FIG. 1, there is shown a prior art lubrication system wherein a gutter-like projection, and a boss portion 2 are both integrally formed with the inner wall of the clutch housing. The boss portion 2 receives therewithin the aforementioned bearing for supporting the main shaft journal. The boss portion 2 is formed with a cut 2a for supplying therethrough lube oil caught by the gutter-like projection 1 to the main shaft journal supporting portion and thenceforth to a lube oil passage which will be described hereinlater.

In use, the input shaft and main shaft are subjected to force by which they are urged away from each other since the gear train has an intermeshed portion located between the shafts. The main shaft is also subjected to force resulting from meshing engagement between the above pinion and ring gear urging the main shaft in a direction opposite the first mentioned urging force. For this reason, it is especially necessary for the boss portion 2 to have sufficient rigidity or structural strength. However, since the cut 2a reduces rigidity, the boss portion 2 requires a considerably large thickness "t" to retain a predetermined rigidity and prevent creepage of the boss portion and resulting gear noise. The boss portion 2 with a large thickness inevitably results in increased weight of the clutch housing. Further, the main shaft is formed at the central part thereof with a lube oil passage supplying lube oil to sliding portions of the gears rotatably mounted on the main shaft. The lube oil caught by the gutter-like projection 1 is supplied to the boss portion 2 and thenceforth to the lube oil passage. In this connection, the cut 2a and part of gutter-like projection 1 adjacent the cut are left open at the inner end part thereof to the interior of the transaxle, resulting in lube oil tending to flow out of the intended course along the gutter-like projection and the cut causing the amount of lube oil supplied into the lube oil passage to become smaller and insufficient.

SUMMARY OF THE INVENTION

In accordance with the present invention, there is provided a transaxle constructed to incorporate an improved lubrication system. The lubrication system employs a funnel-like oil pocket member placed between a gutter-like projection and a boss portion on which a transmission main shaft is journaled at an end thereof. The gutter-like projection catches lube oil splashed by a ring gear of a final gearing, and the main shaft is formed with a lube oil passage for supplying therethrough lube oil to the sliding portions of movable elements mounted on the main shaft. Between the terminal end of the main shaft and the boss portion, there is formed a chamber communicating with the lube oil passage. The boss portion have a through hole establishing communication between the chamber and the outside of the boss portion. The funnel-like oil pocket member has an outlet tube inserted into the through hole in the boss portion to receive lube oil from the gutter-like projection and supply same to the lube oil passage through the outlet tube and the chamber.

With this structure, lube oil can be assuredly and effectively introduced into the lube oil passage in the main shaft and thenceforth to sliding portions of the movable elements.

Further, it becomes necessary only for the boss portion to be formed with the through hole to allow the outlet tube of the oil pocket member to pass therethrough. The boss portion thus has a continuous or endless ring shape for improved rigidity for a given thickness, enabling the transaxle to be lightweight while preventing the creep of boss portion.

It is accordingly an object of the present invention to provide a transaxle which is free from the foregoing drawbacks inherent in the prior art device.

It is another object of the present invention to provide a transaxle of the above mentioned type constructed to incorporate an improved lubrication system to assuredly and effectively introduce lube oil splashed on housing walls to a lube oil passage formed in a transmission shaft.

It is a further object of the present invention to provide a transaxle of the above mentioned type which is light in weight and quiet in operation.

BRIEF DESCRIPTION OF THE DRAWINGS

The features and advantages of the transaxle lubrication system according to the present invention will become more clearly appreciated from the following description taken in conjunction with the accompanying drawings, in which.

DESCRIPTION OF THE PREFERRED EMBODIMENT

Referring to FIGS. 2 to 5, inclusive, the preferred embodiment of the present invention will be described hereinbelow.

Figure 1:
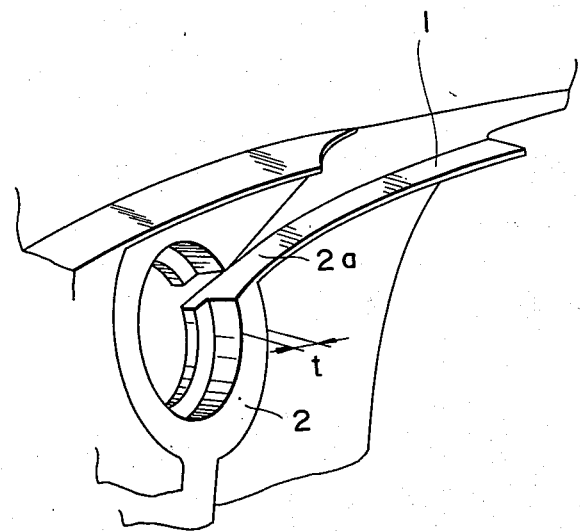
FIG. 1 is a fragmentary perspective view of a prior art transaxle lubrication system with parts removed to better illustrate the portion with which the present invention is particularly concerned.
Figure 2:
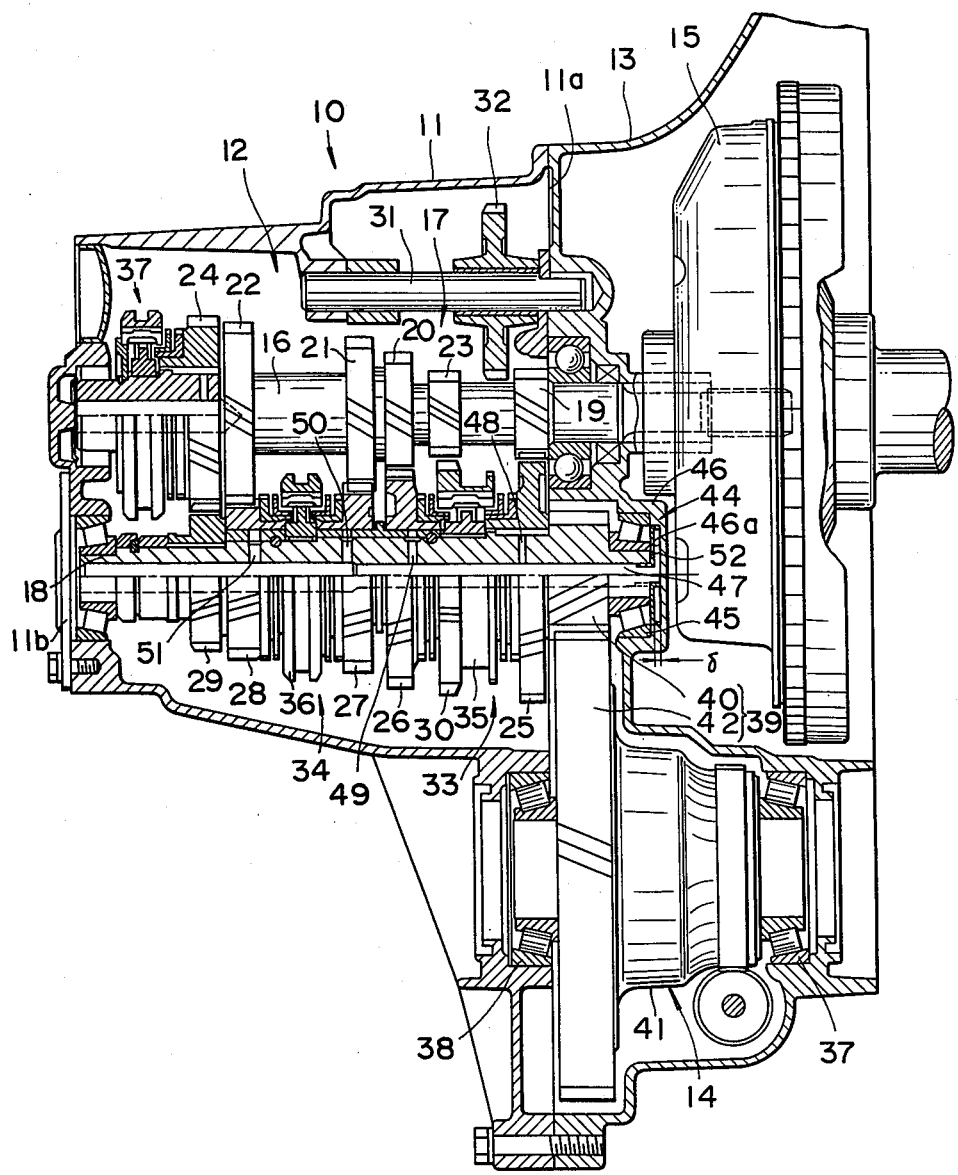
FIG. 2 is a sectional view of a transaxle incorporating a lubrication system according to the present invention.
Figure 3:
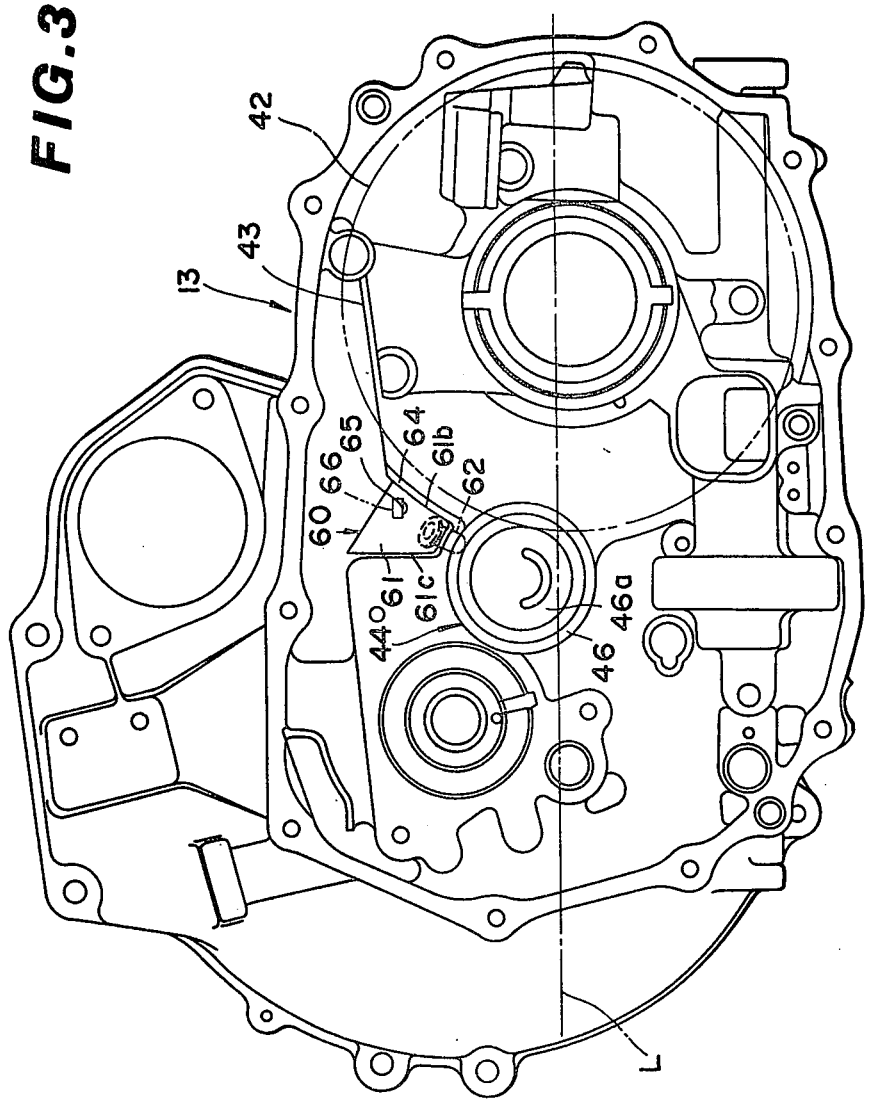
FIG. 3 is a view showing the interior of the clutch housing used in the transaxle of FIG. 2 and constructed to incorporate the lubrication system of the present invention.
Figure 4:
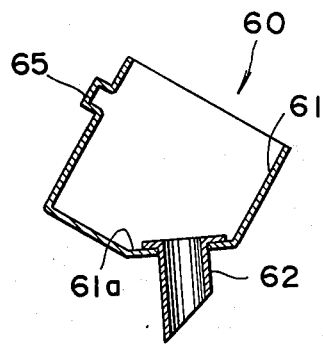
FIG. 4 is an enlarged sectional view of a funnel or funnel-like oil pocket member used in the lubrication system of the present invention.
Figure 5:
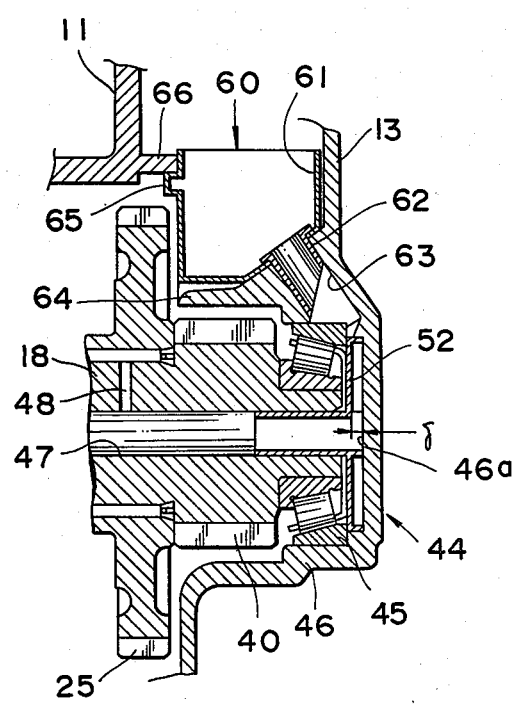
FIG. 5 is a sectional view showing the oil pocket member of FIG. 4 installed.

A transaxle 10 is of the type for use in an F-F vehicle and shown to comprise a transmission 12 placed within a first transaxle housing section or transmission case 11 and a differential 14 placed inside of a second transaxle housing section or clutch housing 13 closing the open end 11a of the transmission case. A clutch 15 is placed outside the clutch housing 13. Within the transmission case 11, an input shaft 16 and an output or main shaft 18 are arranged in parallel to each other. The input shaft 16 is coupled through the clutch 15 with an engine crankshaft (not shown), while main shaft 18 is coupled through a gear train 17 with the input shaft so as to move in relation to the input shaft. One end portion of each of the input shaft 16 and main shaft 18 is journaled for rotation on the clutch housing 13 while the other end of each shaft is journaled for rotation on the closed end 11b of the transmission case 11. The gear train 17 for transmitting motion between the input shaft 16 and main shaft 18, comprises: input gears 19, 20, 21, 22, 23 for the 1st gear, 2nd gear, 3rd gear, 4th gear and reverse gear, respectively, which are integrally formed with the input shaft 16; an input gear 24 for the 5th gear, which is rotatably mounted on the input shaft 16; 1st, 2nd, 3rd, 4th main gears 25, 26, 27, 28 rotatably mounted on the main shaft and constantly meshing with the 1st, 2nd, 3rd, 4th input gears 19, 20, 21, 22, respectively; a 5th main gear 29 splined to the main shaft and constantly meshing with the 5th input gear 24; a reverse main gear 30 integrally formed with a coupling sleeve described below; and a reverse idler gear 32 mounted both for rotation and sliding movement on the reverse idler shaft 31 and upon shifting to the reverse gear position, brought into mesh with both the reverse main gear 30 and reverse input gear 23. The main shaft 18 further carries a 1st and 2nd synchronizer 33 at a location between the 1st and 2nd main gears 25, 26 and a 3rd and 4th synchronizer 34 at a location between the 3rd and 4th main gears 27, 28. A 5th synchronizer 37 for selection of the 5th gear is mounted on the input shaft 16. The differential 14 is placed inside of the clutch housing 13 and is journaled for rotation on the clutch housing 13 and the transmission case 11 by way of roller bearings 37, 38, respectively. Rotation is transmitted from main shaft 18 to differential 14 through a final gearing 39 which is comprised of a pinion 40 secured to the main shaft 18 and a ring gear 42 fixedly attached to a differential case 41 and meshing with the pinion 40. With this arrangement rotation of main shaft 18 is reduced in speed by the final gearing 39 before supplying torque to axle shafts (not shown) through differential 14. The transaxle housing formed from the transmission case 11 and the clutch housing 13 is charged with lube oil up to oil level L (FIG. 3) so that the substantially lower half part of the ring gear 42 is plunged into the lube oil. Upon rotation of the ring gear, the lube oil is splashed by the ring gear to lubricate the transmission elements, and part of the lube oil is also splashed on the inner housing walls of the transaxle. In this connection, the clutch housing 13 has at the inner wall thereof an integral gutter-like projection 43 to catch splashed lube oil on the housing walls and introduce it to the main shaft journal supporting portion 44 of clutch housing 13. In other words, gutter-like projection 43, in the form of a shelf integrally formed with and projecting inwardly from the inner wall of clutch housing 13 and constructed to descend progressively from the part adjacent the side of ring gear 42 toward the main shaft journal supporting portion 44. The clutch housing 13 has at the main shaft journal supporting portion 44 an annular boss portion 46 which receives therein a roller bearing 45 for carrying the clutch housing side main shaft journal. In this connection, it is so constructed and arranged that when the main shaft 18 is installed in place in the boss portion 46 by way of the bearing 45, there is formed a chamber or space δ between the inner bottom 46a of boss portion 46 and the terminal end of the main shaft 18. 47 is a lube oil passage passing through the central part of the main shaft 18, and the main shaft is further formed with holes 48, 49, 50, 51 establishing communication between the sliding portions of the main gears 25, 26, 27, 28 rotatably mounted on the main shaft 18 and the lube oil passage. Through these holes, the lube oil is supplied from the lube oil passage 47 to the sliding portions of the main gears to attain smooth operation of the gears. 52 is a bearing cover closing a side of the bearing 45 facing the space δ to prevent the lube oil in the space δ from being released through bearing 45 and thereby effectively introduce the lube oil from the space δ to lube oil passage 47. In this connection, according to the present invention there is provided a funnel or funnel-like oil pocket member 60 at a location adjacent the lower end of the gutter-like projection 43, i.e., at a location adjacent the main shaft journal supporting portion 44. The oil pocket member 60, as shown in FIGS. 4 and 5, is in the form of a storing portion 61 for storing lube oil supplied thereto through the gutter-like projection 43 and an outlet tube 62 communicating with the storing portion at the bottom thereof to introduce lube oil within the storing portion to the main shaft journal supporting portion 44. The boss portion 46 of the clutch housing 13 is formed with a through hole 63 at the upper part of a wall thereof as shown in FIG. 5. The hole 63 communicates with space δ and is of a diameter corresponding to the outer diameter of the outlet tube 62. Outlet tube 62 is inserted and fitted in the hole 63 so that the lube oil within storing portion 61 of the oil pocket member 60 is introduced into the space δ by way of the outlet tube and the hole. In this manner, the boss portion 46 is adapted to have a continuous or endless ring shape, instead of being formed with cut 2a as in the prior art device. The clutch housing 13 has a rising wall portion 64 adjacent the lower end of the gutter-like projection 43. The rising wall portion 64 defines a recess having a portion corresponding in shape to the opposed side walls 61b, 61c of the oil pocket member 60 so that the oil pocket member fits in the recess. The storing portion 61 of the oil pocket member 60 has a projection 65 which cooperates with a detent projection 66 provided on transmission case 11 to hold the oil pocket member in place and prevent movement of same relative to the adjacent parts.

By the foregoing structure, lube oil within the transaxle housing is splashed by the ring gear 42 and supplied to the various transmission elements. Part of the splashed lube oil on the housing walls is caught by the gutter-like projection 43 and introduced to the storing portion 61 of the funnel-like oil pocket member 60. From the storing portion, the lube oil is introduced through the outlet tube 62 and hole 63 to the space δ between the end of the main shaft 18 and the inner bottom 46a of the boss portion 46. In this manner, the lube oil is assuredly and effectively introduced into space δ and thenceforth to lube oil passage 47, thus increasing the amount of lube oil supplied to the sliding portions of the main gears through the lube oil passage 47. The amount of lube oil to be supplied to lube oil passage 47 is further increased due to the provision of the bearing cover 52 which effectively introduces lube oil into space δ and lube oil passage 47.

While the present invention has been described and shown as an application to the lubrication system for supplying lube oil to the lube oil passage formed in the main shaft, this is not limitative. That is, in case where a lube oil passage is formed in an input shaft, the present invention can be applied to the lubrication system for supplying the splashed lube oil to the lube oil passage in the input shaft to produce the same effect.

Further, while the projection 65 is formed in the storing portion 61 of the oil pocket member 60 to engage the limiting projection 66 formed in the transmission case 11, this is not limitative. That is, the limiting projection may be provided on the clutch housing while the projection on the storing portion may be formed at a location where it cooperates with the limiting projection of the clutch housing to produce the same effect.

From the foregoing, it is to be understood that owing to the provision of the funnel-like oil pocket member according to the present invention, lube oil can be assuredly and effectively introduced to the lube oil passage formed in the main shaft.

Further, it is to be understood that owing to the provision of the funnel-like oil pocket member according to the present invention, it is only necessary for the annular boss portion to be formed with the through hole for allowing the outlet tube to pass therethrough. The boss portion thus has a continuous or endless ring shape and can get a large rigidity for a given thickness, allowing to reduce the thickness of the boss portion to attain the lightweight.

Obviously, many variations and modifications of the present invention are possible in light of the above teachings. It is, therefore, to be understood that within the scope of the appended claims, the invention may be practiced otherwise than as specifically described.

What is claimed is:

1. A transaxle comprising a housing charged with lube oil and having first and second housing sections; a transmission placed within said first housing section and including a pair of generally parallel first and second shafts having mounted thereon a gear train for transmitting motion between the shafts, said first shaft having movably mounted thereon a plurality of movable elements including gears forming part of said gear train and further having a lube oil passage for supplying therethrough lube oil to sliding portions of said movable elements; a final gearing and differential placed inside of said second housing section and coupled with said transmission to form a single unit, said final gearing having a ring gear plunged into the lube oil within said second housing, said second housing having at the inner wall thereof a boss portion on which said first shaft is journaled at an end thereof, said first shaft having adjacent said journal thereof a terminal end face which cooperates with said boss portion to define a chamber, said lube oil passage having an open end opening to said terminal end face of said first shaft, said boss portion having a through hole establishing communication between said chamber and the outside of said boss portion, a gutter-like projection provided on the inner wall of said second housing section to collect lube oil splashed and carried by said ring gear and constructed to descend slowly toward said boss portion so as to convey lube oil toward the boss portion, said gutter-like projection having a portion thereof extending at approximately the same elevational position as a portion of the ring gear to overlap one of the sides of said ring gear to collect thereat lube oil sticking to said one side of the ring gear, and a funnel-like oil pocket member mounted on the inner wall of said second housing section at a location between said gutter-like projection and said boss portion, said oil pocket member having a storing portion for storing lube oil supplied thereto from said gutter-like projection and an outlet tube communicated with said storing portion and inserted into said through hole to introduce the lube oil from said storing portion to said chamber.

2. A transaxle as set forth in claim 1, wherein said funnel-like oil pocket member and said first housing section are formed with projections respectively engaging each other to hold said oil pocket member in place.

3. A transaxle as set forth in claim 1, wherein said first shaft journal is carried by said boss portion by a rolling-element type bearing and wherein there is provided a bearing cover closing a side of said bearing facing said chamber to prevent lube oil in said chamber from being released through said bearing.

4. The transaxle of claim 1, wherein said oil pocket member is further located adjacent the circumferential periphery of the ring gear so as to catch and store lube oil thrown by said ring gear directly.

* * * * *